UNITED STATES PATENT OFFICE.

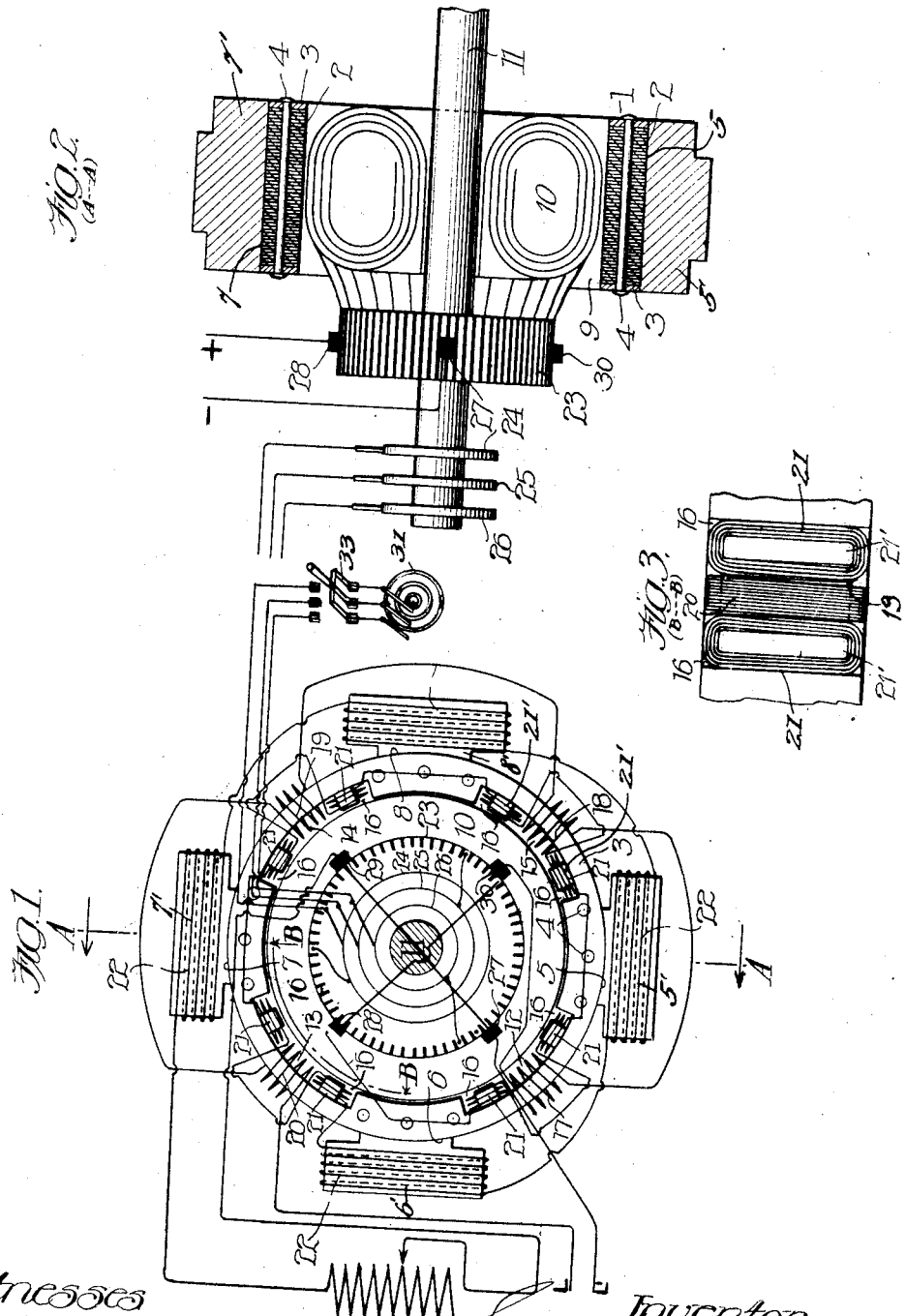

SAMUEL H. MARTIN, OF CHICAGO, ILLINOIS.

SYNCHRONOUS CONVERTER.

1,171,130.

Specification of Letters Patent.

Patented Feb. 8, 1916.

Application filed August 22, 1912. Serial No. 716,407.

*To all whom it may concern:*

Be it known that I, SAMUEL H. MARTIN, a citizen of the United States of America, and a resident of Chicago, county of Cook, State of Illinois, have invented certain new and useful Improvements in Synchronous Converters, of which the following is a specification.

The main objects of this invention are to provide an improved rotary transformer for transforming single and polyphase alternating currents into direct currents or the reverse; to provide an improved device having the combined characteristics of a direct current generator, and of the usual alternating current induction motor, which is capable of operating either as a direct current compound motor or as an alternating current synchronous motor; to provide improved means which insure the starting characteristics of the usual induction motor and effectively prevent variation in armature speed due to pulsations of the field flux; to provide improved means for increasing the field flux and thereby raising the delivered voltage with increase of load; to provide improved means for adjusting the device to operate with a power factor at or nearly unity; to provide improved means for protecting the usual field windings against excessive induced voltage; to provide a synchronous converter of this kind with an improved form of construction of magnetic screen and damper, and to provide an improved system of windings on a magnetic screen in such manner as to automatically regulate the voltage, and at the same time prevent magnetic leakage when operated under load.

A specific construction illustrating this invention is shown in the accompanying drawings, in which—

Figure 1 is a diagrammatic end view of an electric current converter provided with a continuous magnetic screen and damper structurally combined and interposed between the pole faces of the field frame and the rotor, the screen being provided with a winding or windings capable of controlling the position and amount of magnetism therein under varying conditions of speed voltage and load. Fig. 2 is a transverse section of the same taken on the line A—A of Fig. 1. Fig. 3 is a sectional detail taken on the line B—B of Fig. 1.

In the construction shown in the drawings the magnetic screen or cylinder 1 is provided with a series of slots or openings which will be hereinafter described. The screen is built up of laminated rings 2, which are mounted between conducting end rings 3, the whole being fastened together into one integral structure by means of embedded copper rivets or bolts 4, which are placed as near the inner surface of the screen as good mechanical construction will permit. The external curved surface of the screen 1 is turned or machined to fit and is embraced and held in place by the pole faces 5, 6, 7 and 8 of the main poles 5', 6', 7' and 8', which in turn are secured to the usual stationary field frame. (Not shown). An air gap 9 is provided between the inner surface of the screen 1 and a rotor 10, which is mounted on the shaft 11.

Symmetrically placed midway between the pole faces 5, 6, 7 and 8, are four slots 12, 13, 14 and 15, and also symmetrically placed are eight relatively smaller slots 16. The larger slots 12, 13, 14 and 15, are designed each to carry one side of three separate windings. The central coils or windings 17, 18, 19 and 20 in the large slots each consists of a very small number of turns of heavy wire wound about the screen (ring wound) and occupy approximately one-third of the central space of each of the larger slots 12, 13, 14 and 15. The outer portion of each of the larger slots is designed to receive one side of each of a pair of form wound coils 21 which extend to and occupy the adjacent smaller slots 16.

The magnetization of the main poles 5', 6', 7' and 8' is provided for by shunt field windings 22, which are connected in series relation with one another. The magnetization of both the main field poles and the supplementary poles 21' on the screen ring is accomplished by connecting in series across the direct current brushes the field coils 22 and the form wound coils 21, the form wound coils being connected to produce the same polarity as that of the adjacent main pole faces. The polarity of the several main poles and the direction of flux in the several magnetic circuits is indicated by letters N and S and by arrows, respectively, on Fig. 1.

The rotor 10 is provided with the usual direct current commutator 23 and with three slip rings 24, 25 and 26. Each slip ring is connected to one of the commutator bars, the respective commutator bars being so selected as to have instantaneous voltage values corresponding to an angular displacement of 120 degrees or the three phase relation. Direct current brushes 27, 28, 29 and 30 are equally spaced upon and coact with the direct current commutator 23. Alternate brushes are of like polarity and may be connected in pairs, as indicated in Fig. 1. A variable resistance 32 is connected in series with the field coils 21 and 22 for regulating the field strength.

The arrangement of the windings on the screen 1 is preferably in the following form: The form windings 21 are arranged in a series of pairs spaced apart circumferentially around the screen 1, each of the coils 21 in each pair being of different polarity from its mate and the windings having the same polarity being placed adjacent to each other so that the north pole of one pair will be adjacent the north pole of the next adjacent pair, and the south pole of a given pair will be adjacent the south pole of the next adjacent pair, and so on; the ring windings 17, 18, 19 and 20 being respectively interposed between the form windings 21 composing each of the series of pairs in their order around the screen 1, and the said form windings being so arranged that the two poles of like polarity in each group of two adjacent pairs with respect to the main field windings, will be positioned adjacent a field winding of like polarity. The polarity of both the form windings and the ring windings is the same as the adjacent main poles.

In the operation of the machine in transforming polyphase alternating currents into direct currents, connection between the alternating current supply 31 and the three slip rings 24, 25, and 26 may be closed directly through the switch 33. By reason of construction and the polyphase connection of the alternating current circuit to the rotor, the current is distributed to produce in the rotor 10 a rotating magnetic field. Since the rotor 10 is surrounded by the closed magnetic ring or screen 1 (having closed induction current circuits) the starting action will be similar to the usual polyphase induction motor, in which, however, the squirrel cage wound element usually rotates. The squirrel cage element comprising the bar conductor 4 and the connecting end plates 3 in this device is stationary, but the starting characteristic is dependent only upon the relative rotation of the elements.

The continuous current output is conducted from the rotor 10 by means of the four brushes 27, 28, 29 and 30, and the localization of the magnetic poles on the screen 1 is in part provided by a circuit, starting from brush 29 to the variable resistance 32, thence through the shunt field coils 22, thence through the form wound coils 21, thence to brush 28. The shunt wound coils 22 produce the four poles 5', 6', 7' and 8' of alternate polarity and the form wound coils 21 produce the supplementary poles of the same polarity as the adjacent main poles. The series coils 17, 18, 19 and 20 are connected to oppose cross magnetization and distortion of the field due to the load and increase the effective magnetic flux.

When the device is started, as soon as the direct current voltage rises the magnetic screen will have fixed magnetic poles, each produced by the joint effect of a main pole and the adjacent supplementary poles, and there will be leakage between adjacent main poles of unlike polarity through the screen, past the slots 12, 13, 14 and 15. The amount of magnetization produced by the shunt field coils 22 and the form wound coils 21 will vary with the voltage between any two adjacent direct current brushes 27, 28, 29 and 30. An adjustment of the amount of magnetization or field strength and hence the power factor of the device is controllable by the manipulation of the adjustable rheostat 32. The direct current output or load is connected to the device on a circuit beginning at the brush 30, thence to the ring wound coils 17, located in the center of the slots 12 on the screen 1, and thence in succession to the ring wound coils 18, 19 and 20 to the terminal L. The brush 27 is directly connected to the terminal L'. When the load circuit L—L' is closed the ring wound coils 17, 18, 19 and 20 magnetize the screen ring 1, in opposition to the normal leakage and in proportion to the current on the load circuit carried by the machine, the magnetization produced by the ring wound coils being of the same polarity as the adjacent main pole faces. The operation in transforming from single phase alternating to direct current is substantially the same as described, with the addition of the usual phase splitting arrangement or the use of the commutator in series with a field coil in starting. The operation in transforming from direct current to alternating current comprises the usual methods used in starting a compound motor, the alternating current output being taken from the slip rings.

Although but one specific embodiment of this invention has been herein shown and described, it will be understood that numerous details of the construction shown may be altered or omitted without departing from the spirit of this invention, as defined by the following claims.

I claim:

1. A synchronous converter, comprising an armature, windings therefor, a field magnet comprising an annular series of poles spaced apart circumferentially, a magnetic screen mounted between said field poles and said armature and having squirrel cage conductors thereon, windings mounted on said screen and arranged in sets interposed between adjacent poles, each set comprising form windings spaced apart, and ring windings located between them for the purpose specified.

2. In a device of the class described, an annular magnetic screen member, formed and adapted to house and support the essential elements of a squirrel cage winding and having thereon an annular series of slots spaced apart circumferentially, squirrel cage windings arranged on said screen to serve either as a damper or as induction armature circuits, a series of form windings mounted on said screen, said form windings being connected in series and disposed one adjacent to and lying partially within each side of said slots, and a series of ring windings mounted on said screen one being interposed between each pair of said form windings for the purpose specified.

3. A magnetic screen for synchronous electric current converting machines, comprising an annular ring embodying squirrel cage construction, said ring having an annular series of spaced slots and having an annular series of relatively narrow slots adjacent said first named slots, ring windings in said first named slots and form windings in said narrow slots, series connections for said ring windings with respect to the direct current line, and shunt connections for the form windings and adapted to control the position and amount of magnetism in said damper under varying conditions and load.

4. In a synchronous dynamo electric machine having a main field magnet system, an armature and brushes for the armature, a magnetic screen disposed between the said armature and field magnet system and comprising an annular ring having squirrel cage members structurally embodied therein; said ring also having a series of slots symmetrically disposed therein, a system of windings mounted in said slots comprising ring windings and form windings arranged with the axes of adjacent ring and form windings substantially transverse to each other, respectively, and each kind being connected in a series by itself, connections for bringing one series of windings across the brushes for control by potential of the machine and other means for connecting the second set of windings in series with the line for control by the load current of said machine, for the purpose specified.

5. In a device of the class described, a rigidly fixed annular magnetic screen, in combination with a damper of squirrel cage construction supported and housed thereby and a series of ring windings mounted on said screen for the purpose specified.

6. In a device of the class described, the combination of main poles, field windings therefor, an armature, an armature winding, a commutator, direct current brushes, collector rings, alternating current brushes, a fixed annular magnetic screen comprising a magnetic ring of squirrel cage construction interposed between said armature and said poles, an annular series of form windings mounted on said ring and connected in series between the field windings and one of the direct current brushes, an annular series of ring windings spaced apart circumferentially on said ring and interposed at uniform intervals between said form windings for superimposing upon said screen extra magnetic flux, in opposition to the leakage flux, said ring windings being connected in series with the line connected to the direct current brushes for conducting unidirectional current transversely around said screen for controlling the position and amount of magnetism in said screen under various conditions of load.

7. In a device of the class described, a magnetic screen comprising a laminated ring having main and supplementary polar projections formed and spaced apart circumferentially thereon, adjacent main polar projections being of opposite polarity, a series of windings arranged alternately in pairs of different polarity on said supplementary polar projections and connected to have supplementary poles of like polarity adjacent to the main poles of the same polarity and other windings interposed between the said windings in each of said pairs for conducting unidirectional current transversely around said ring to control the position and amount of magnetism in said screen.

8. In a dynamo-electric machine, a field magnet system comprising a yoke member having a plurality of magnetic poles symmetrically disposed and facing inward about a central axis, in combination with a separate and continuous magnetic screen of annular shape rigidly embraced by said poles and fitting tightly against the inner faces thereof, said screen comprising a plurality of annular magnetic laminations clamped together side by side, annular end plates for said screen, and a plurality of transversely positioned bolts disposed in groups adjacent to said poles for clamping said end plates and laminations together, said end plates and bolts being of low electrical resistance and adapted to serve as an electric damper.

9. In an electrical apparatus of the class described, a rotary armature and a plurality of constantly excited stationary field poles of alternate polarity symmetrically disposed about said armature, in combination with an annular magnetic screen fitting within and held rigidly in place by said poles, and a series of supplementary poles provided and arranged in pairs on said screen substantially flush with the inner surface thereof and adjacent opposite sides of said field poles for supplementing and steadying the latter.

10. In an electrical apparatus of the class described, the combination of an annular system of fixed main field poles, a rotary armature, a magnetic screen ring interposed between the said poles and armature and a series of supplementary poles provided on said screen and arranged in pairs adjacent to said main poles on opposite sides thereof and of like polarity therewith respectively.

11. In an electrical apparatus of the class described, a rotary armature and a plurality of constantly excited stationary field poles of alternate polarity symmetrically disposed about said armature in combination with a stationary annular magnetic screen interposed between said armature and said poles, and a plurality of series ring windings symmetrically disposed on said screen between said poles and connected to oppose magnetic leakage, and to strengthen the fields.

12. In an electrical apparatus of the class described, a rotary armature and a plurality of constantly excited stationary field poles of alternate polarity symmetrically disposed about said armature in combination with a stationary annular magnetic screen interposed between said armature and said poles, an annular series of supplementary poles formed on said screen in pairs adjacent to said main poles on opposite sides thereof and of like polarity therewith respectively, and a plurality of series ring windings symmetrically disposed on said screen between said poles and connected to oppose magnetic leakage and to strengthen the fields.

13. In an electrical apparatus of the class described, a rotary armature and a plurality of stationary field poles disposed symmetrically thereabout, in combination with a fixed annular magnetic screen interposed between said armature and poles, damper windings arranged opposite the pole faces and carried by said screen adjacent to the armature to oppose magnetic flux pulsations in the armature and field poles, and series load coils arranged on said screen to oppose magnetic leakage through said screen.

14. In an electrical apparatus of the class described, an armature and a field magnet system comprising a plurality of poles, arranged for relative rotation, in combination with a screen disposed between the said armature and poles and securely held by the latter, said screen having supplementary poles adapted and arranged adjacent to the main poles to supplement and steady the flux of the main poles, exciting coils for said main and supplementary poles and a rheostat connected in series therewith for regulating their field strength.

15. In a dynamo-electric machine having an annular series of magnetic poles, an annular laminated magnetic screen separate from but mounted upon and held rigidly by said poles, an electric damper constructed in combination with said screen and arranged to secure the screen laminations together, said damper comprising a pair of rings disposed on opposite sides of said screen, a plurality of bars arranged transversely and clamping said plates against said screen, said bars being arranged in groups and spaced apart peripherally, each group being adjacent to one of said poles respectively, and magnetizing windings disposed on said screen intermediately of adjacent groups of bars respectively, said screen being slotted transversely between said poles to receive said windings.

16. In a converter of the character described, an armature member and a field member arranged for relative rotation, said field member having a plurality of poles and a screen disposed within and connecting the said poles, said screen carrying and housing damper windings disposed adjacent to the said poles, and also carrying regulating coils disposed intermediately of said poles.

17. In a device of the character described, a field system comprising an annular yoke having main poles, in combination with an annular magnetic screen mounted upon said poles, said screen being formed with a series of alternately arranged slots and polar projections, the latter being arranged to register with said main poles respectively, and electric windings in said slots.

Signed at Chicago this 16th day of July, 1912.

SAMUEL H. MARTIN.

Witnesses:
PHILIP B. WOODWORTH,
EDWIN PHELPS.